United States Patent [19]

Shiao

[11] Patent Number: 5,379,873
[45] Date of Patent: Jan. 10, 1995

[54] RATCHET MECHANISM HOUSING ASSEMBLY FOR A RATCHET SCREWDRIVER

[76] Inventor: Hsuan-Sen Shiao, No. 36, Lane 30, Sec. 2, Pei-Ping Road, Taichung City,

[21] Appl. No.: 35,050

[22] Filed: Mar. 22, 1993

[51] Int. Cl.$^6$ .................. B25B 23/00; F16D 41/18
[52] U.S. Cl. ............................... 192/43; 81/63.1
[58] Field of Search ............ 192/43, 43.1; 81/63.1, 81/62, 60, 58, 58.4

[56] References Cited

U.S. PATENT DOCUMENTS

| | | | |
|---|---|---|---|
| 593,157 | 11/1897 | Furbish | 192/43 |
| 1,478,212 | 12/1923 | Fegley et al. | 192/43.1 |
| 2,503,373 | 4/1950 | Browning et al. | 192/43.1 X |
| 4,290,328 | 9/1981 | Clark | 81/62 |
| 4,621,718 | 11/1986 | DeCarolis | 192/43 |
| 4,696,208 | 9/1987 | Lay | 81/63.1 X |

*Primary Examiner*—Rodney H. Bonck
*Attorney, Agent, or Firm*—Ladas & Parry

[57] ABSTRACT

A ratchet mechanism housing assembly includes an elongated housing which has an axially extending cavity that receives a drive shaft with a ratchet wheel, and an axially extending peripheral slot that is confined by a pair of opposing vertical walls, each of which being formed with a horizontal inwardly projecting shoulder. The housing is further formed with a horizontal bridge surface that extends across the shoulders, an inclined support face that extends rearwardly and downwardly along a rear edge of the bridge surface, and two stop walls that extend vertically upward from two sides of the inclined support face. The shoulders and the bridge surface support the ratchet pawls in the peripheral slot. During operation, the ratchet pawls abut tightly the shoulders and the bridge surface to prevent inclination and deformation of the ratchet pawls when the ratchet pawls engage the ratchet wheel and to permit generation of a large torsional force.

9 Claims, 1 Drawing Sheet

RATCHET MECHANISM HOUSING ASSEMBLY FOR A RATCHET SCREWDRIVER

BACKGROUND OF THE INVENTION

1. Field of the Invention

The invention relates to a ratchet screwdriver, more particularly to a ratchet mechanism housing assembly of a ratchet screwdriver which can permit the generation of a larger torsional force than the prior art.

2. Description of the Related Art

Ratchet screwdrivers are known in the art. An example of such a screwdriver has been disclosed in U.S. Pat. No. 4,621,718 and comprises a ratchet mechanism housing assembly which includes a drive shaft that has a ratchet wheel mounted thereon and an elongated housing that has an axially extending cavity with a closed end and an open end opposite the closed end, and an axially extending peripheral slot formed therein. The drive shaft extends into the cavity via the open end such that the ratchet wheel is positioned operatively within the housing at a point about midway along the length of the peripheral slot. Two ratchet pawls are positioned in the peripheral slot to engage selectively the teeth of the ratchet wheel so as to provide forward, reverse or combination drive in a conventional manner. The ratchet pawls are selectively engaged with and disengaged from the ratchet wheel by means of a slidable thumb actuator which is positioned operatively within the peripheral slot.

SUMMARY OF THE INVENTION

The objective of the present invention is to modify the construction of the ratchet mechanism housing assembly of a ratchet screwdriver so as to permit the generation of a larger torsional force than can be obtained by prior art mechanisms.

The preferred embodiment of a ratchet mechanism housing assembly of the present invention comprises:

an elongated housing having an axially extending cavity with a closed end and an opposite open and, and an axially extending peripheral slot with a pair of first corners adjacent to the closed end and respectively formed with a circumferentially extending first notch, and a pair of second corners adjacent to the open end and respectively formed with a circumferentially extending second notch, said peripheral slot being confined by a pair of opposing vertical walls, each of which being formed with a horizontal inwardly projecting shoulder, said elongated housing further having a horizontal bridge surface extending across the shoulders and being formed adjacent to the first notches, an inclined support face extending rearwardly and downwardly along a rear edge of the bridge surface, and two stop walls extending vertically upward from two sides of the inclined support face;

a rotatable drive shaft having a ratchet wheel mounted thereon, said drive shaft extending into the cavity via the open end such that the ratchet wheel is positioned operatively within the housing about midway along the peripheral slot; and two ratchet pawls positioned in the peripheral slot such that a wide end portion of the ratchet pawls extends into and between a corresponding one of tine first and second notches, said ratchet pawls being supported by said shoulders and said bridge surface in said peripheral slot, said ratchet pawls abutting tightly the shoulders and the bridge surface to prevent inclination and deformation of the ratchet pawls when the ratchet pawls engage the ratchet wheel and permit generation of a large torsional force.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
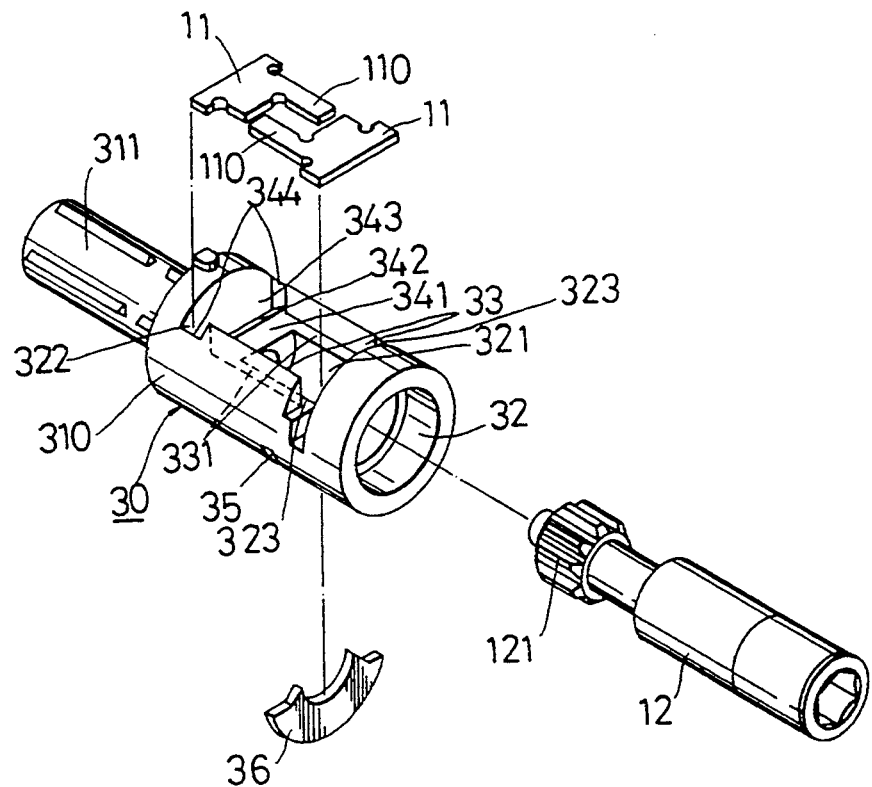
FIG. 1 is an exploded view of the preferred embodiment of a ratchet mechanism housing assembly for a ratchet screwdriver in accordance with the present invention.
Figure 2:
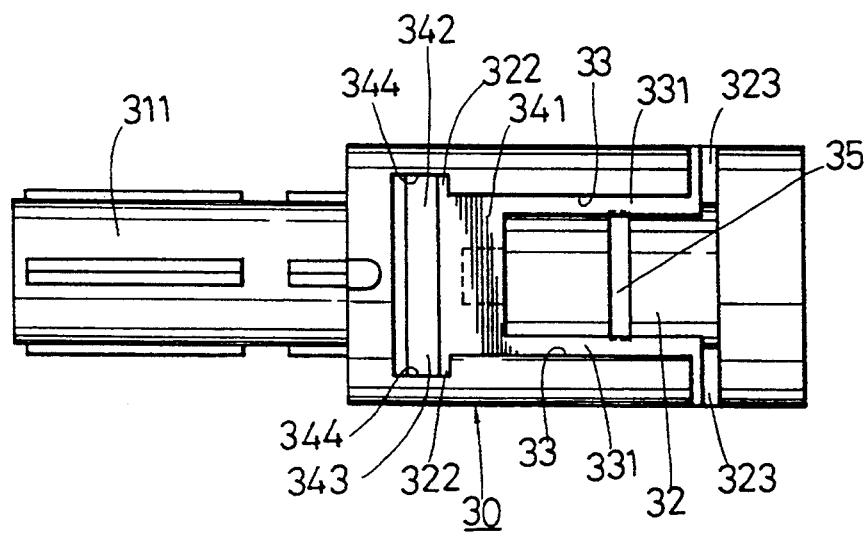
FIG. 2 is a top view of a ratchet housing of the preferred embodiment.

Referring to FIGS. 1 and 2, the preferred embodiment of a ratchet mechanism housing assembly according to the present invention is shown. It comprises a ratchet housing (30) and the ratchet housing (30) includes a hollow substantially cylindrical elongated housing portion (310) having an axially extending cavity (32) therein and an integral extension (311) which projects rearwardly from a closed end of the housing portion (310). The extension (311) is formed with axially extending teeth so as to permit tight and secure connection with an elongated handle (not shown) of the ratchet screwdriver. The housing portion (310) is formed with an axially extending peripheral slot (321). The peripheral slot (321) has two corners adjacent to the closed end of the housing portion (310) which are respectively formed with a circumferentially extending first notch (322) and two corners adjacent to an open end of the housing portion (310) which are respectively formed with a circumferentially extending second notch (323). A rotatable drive shaft (12) has a front portion which extends into the cavity (32) via the open end of the housing portion (310) and which is mounted rotatably to the closed end of the latter. A ratchet wheel (121) is mounted on the front portion of the drive shaft (12) such that the former is positioned operatively within the housing portion (310) at a point about midway along the length of the peripheral slot (321). Two ratchet pawls (11) are positioned in the peripheral slot (321) such that a wide end portion of the former extends into and between a corresponding one of the first and second notches (322, 323). Each of the ratchet pawls (11) has a finger portion (110) which extends along the peripheral slot (321) and which engages selectively the teeth of the ratchet wheel (121) so as to provide for forward, reverse or combination drive in a conventional manner. The ratchet pawls (11) are selectively engaged with and disengaged from the teeth of the ratchet wheel (121) by means of a slidable thumb actuator (not shown) provided operatively within the peripheral slot (321). The housing portion (310) is further formed with a circumferential slot (35) for receiving a segment stop (36) therein. The segment stop (36) abuts one side of the ratchet wheel (121) to prevent axial movement of the drive shaft (12) in the cavity (32).

The preceding paragraph details the similarities between the present invention and the prior art. The characterizing features of the present invention are as follows:

The peripheral slot (321) is confined by a pair of opposing vertical walls (33). Each of the vertical walls (33) is formed with a horizontal inwardly projecting shoulder (331). The two ends of each shoulder (331) extend into a respective one of the first and second notches (322, 323). A horizontal bridge surface (341) with a predetermined width extends across the shoulders (331) and is disposed adjacent the first notches (322). An inclined support face (342) extends rearwardly and downwardly along a rear edge of the bridge surface (341). Two stop walls (344) extend vertically upwardly from two sides of the inclined support face (342). The inclined support face (342) and the stop walls (344) cooperate with the closed end of the housing portion (310) so as to define a recess (343) which is accessible via the peripheral slot (321).

The shoulders (331) and the bridge surface (341) support the ratchet pawls (11) when the latter are disposed in the peripheral slot (321). When the selected one of the ratchet pawls (11) engages the teeth of the ratchet wheel (121), the ratchet pawl (11) is urged to abut tightly the shoulders (331) and the bridge surface (341). Inclination of the ratchet pawls (11) is thus prevented to avoid deformation of the latter. Furthermore, the vertical walls (33), the bridge surface (341), the inclined support face (342) and the stop walls (344) cooperatively permit the generation of a larger torsional force (approximately 250 to 280 kg-f/cm$^2$) compared to the prior art (approximately 118 kg-f/cm$^2$).

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A ratchet mechanism housing assembly for a hand tool, including
    an elongated housing having an outer surface, an axially extending cavity with a closed end and an opposite open end, and an axially extending peripheral slot in said outer surface and with a pair of first corners adjacent to said closed end and which are respectively formed with a circumferentially extending first notch, and a pair of second corners adjacent to said open end and which are respectively formed with a cirumferentially extending second notch, said peripheral slot being defined by a pair of opposing walls which have a respective longitudinal shoulder projecting therefrom,
    a rotatable drive shaft having a ratchet wheel mounted thereon, said drive shaft extending into said cavity via said open end such that said ratchet wheel is positioned operatively within said housing about midway along said peripheral slot, and
    two ratchet pawls positioned in said peripheral slot and supported on said longitudinal shoulders of said opposing walls, said ratchet pawls engaging selectively said ratchet wheel, one of said pawls, having a wide end portion with two distal end sections that, extend respectively into said first notch, the other one of said ratchet pawls having a wide end portion with two distal end sections that extend respectively into said second notch,
    said shoulders supporting said ratchet pawls in said peripheral slot;
    whereby, said ratchet pawls abut tightly said shoulders to prevent inclination and deformation of said ratchet pawls when said ratchet pawls engage said rachet wheel and to permit generation of a large torsional force.

2. The ratchet mechanism housing assembly as claimed in claim 1, wherein each of said shoulders has two ends which extend into a respective one of said first and second notches.

3. A ratchet mechanism housing assembly as claimed in claim 1, wherein said elongated housing further has a horizontal bridge surface extending across its shoulders and being formed adjacent to said first notch and an inclined support face extending away from said first notch along an edge of said bridge surface.

4. The ratchet mechanism housing assembly as claimed in claim 3, further including two stop walls extending from two sides of said inclined support face toward said outer surface of said elongated housing.

5. The ratchet mechanism housing assembly as claimed in claim 4, wherein said bridge surface supports said ratchet pawls in said peripheral slot.

6. A ratchet mechanism housing assembly for a hand tool, comprising:
    an elongated housing having an axially extending cavity with a closed end and an opposite open end, and an axially extending peripheral slot with a pair of first corners adjacent to said closed end and which are respectively formed with a circumferentially extending first notch, and a pair of second corners adjacent to said open end and which are respectively formed with a circumferentially extending second notch, said peripheral slot being confined by a pair of opposing walls which have a respective longitudinal shoulder projecting therefrom:
    a rotatable drive shaft having a ratchet wheel mounted therein, said drive shaft extending into said cavity via said open end such that said ratchet wheel is positioned operatively within said housing about midway along said peripheral slot, and
    two ratchet pawls disposed in said peripheral slot and supported on said longitudinal shoulders of said opposing walls, said ratchet pawls engaging selectively said ratchet wheel, one of said ratchet pawls having a wide end portion with two distal end sections that extend respectively into said first notch, the other one of said ratchet pawls having a wide end portion with two distal end sections that extend respectively into said second notch
    wherein each of said longitudinal shoulders has two opposite ends, each of which extending into a respective one of said first and second notches.

7. A rachet mechanism housing assembly for a hand tool as claimed in claim 6, wherein said elongated housing further has a horizontal bridge surface extending across its shoulders and being formed adjacent to said first notch and an inclined support face extending away from said first notch along an edge of said bridge surface.

8. The ratchet mechanism housing assembly as claimed in claim 6, further including two stop walls extending from two sides of said incline support face toward said outer surface of said elongated housing.

9. The ratchet mechanism housing assembly as claimed in claim 6, further including a bridge surface for supporting said one of said ratchet pawls in said peripheral slot.

* * * * *